Oct. 1, 1940.  J. L. REINARTZ  2,216,520
AUTOMOBILE RADIO RECEIVER VOLUME CONTROL
Filed April 13, 1939
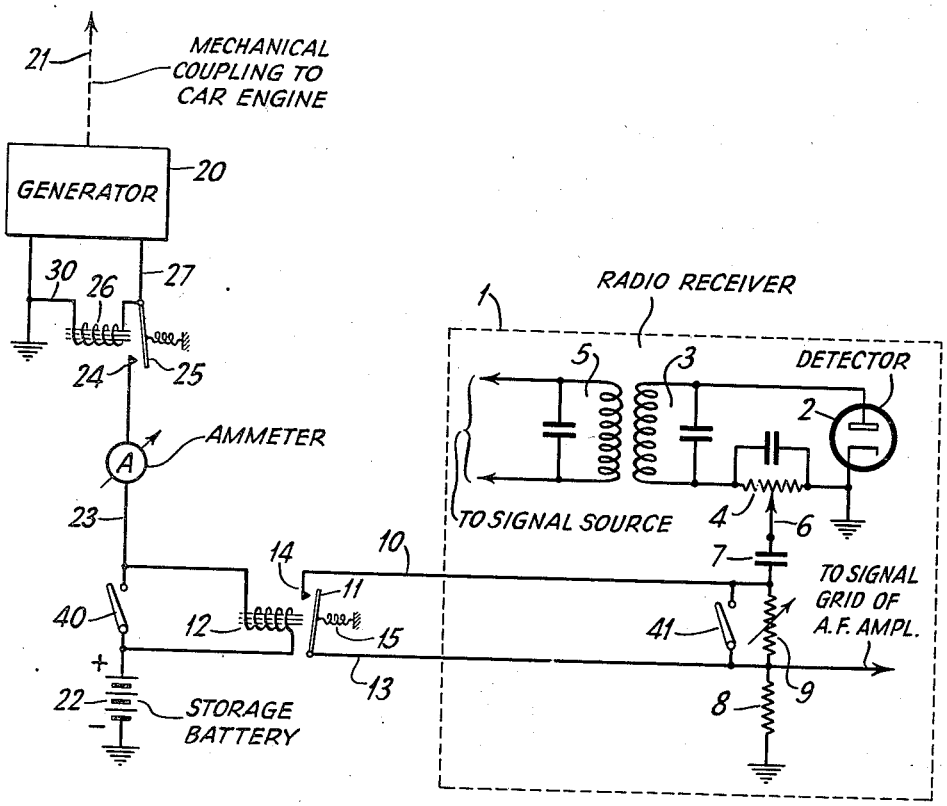
INVENTOR.
JOHN L. REINARTZ
BY
ATTORNEY.

Patented Oct. 1, 1940

2,216,520

UNITED STATES PATENT OFFICE 2,216,520

AUTOMOBILE RADIO RECEIVER VOLUME CONTROL

John L. Reinartz, Arlington, Va., assignor to Radio Corporation of America, a corporation of Delaware Application April 13, 1939, Serial No. 267,577

8 Claims. (Cl. 250—20)

My present invention relates to volume control circuits for automobile radio receivers, and more particularly to devices for automatically regulating the volume level of the reproduced sound in response to variations in the speed of an automobile.

Automobile radio receivers have an operating disadvantage which has been recognized in the past as being objectionable. For example, while driving through a city, where frequent stops and starts are the rule, it often becomes necessary to turn down the manual volume control device in order that the reproduced signal volume level may not be too loud while the car is standing still. As soon as the automobile is placed in operation so as to move at a considerable speed, the manual volume control device must be turned up again in order to have the volume level considerably above the noise usually associated with a moving automobile. Again, experience has shown that even when driving an automobile along a motor highway, wind and other noises associated with a fast moving automobile necessitate adjusting the manual control device so that the volume level of the reproduced sound of the radio receiver is quite high. Obviously, as soon as an automobile with such maximum volume level adjustment is brought to a stop, say at a gas station or other such location, the volume level is entirely too high, and the volume control device must of necessity be adjusted considerably to reduce the volume level.

Accordingly, it may be stated that it is one of the main objects of my present invention to provide an arrangement which eliminates the need for the re-adjustment of the manual volume control device during the speed transition periods of the automobile, and the arrangement essentially comprising an audio volume control instrumentality which is operatively associated with the normal volume control device of the receiver, the auxiliary volume control means having its operation regulated by the storage battery charging current of the automobile.

Another important object of this invention is to employ solely two simple elements in the usual automobile radio receiving system, and these elements comprising an electromagnetic relay located in the storage battery charging line, and an auxiliary volume control device whose effectiveness is arranged to be controlled by the relay; the auxiliary volume control device being arranged in operative relation with the normal volume control element of the radio receiver so that when the automobile is "idling" or operating at a low speed the volume level of the receiver will be of a desired normal magnitude, while when the automobile is in operation above a predetermined speed, then the battery charging current will function to cause the relay to render the auxiliary volume control device ineffective whereby the volume level of the receiver will be increased.

Still other objects of this invention are generally to improve the efficiency of operation of automobile speed-responsive devices for controlling the volume of the receiver, and more especially to provide such a device which is not only reliable, but is economically manufactured and assembled in an automobile radio receiving system.

The novel features which I believe to be characteristic of my invention are set forth in particularity in the appended claims; the invention itself, however, as to both its organization and method of operation will best be understood by reference to the following description taken in connection with the drawing in which I have indicated diagrammatically a circuit organization whereby my invention may be carried into effect.

Referring now to the accompanying drawing, the numeral 1 designates a dotted rectangle which is to be understood as representing any conventional type of radio receiver employed in automobiles. For example, such a receiver is usually compact in construction, and those skilled in the art are fully aware of the fact that the receiver may be of the superheterodyne type or of the tuned radio frequency type. It is to be understood, of course, that the present invention is not limited to receivers employed in automobiles, but may be applied to receivers located in other moving vehicles, such as railroad trains, airplanes, fast moving boats, and the like. Assuming that the receiver 1 is of the superheterodyne type the number 2 denotes the detector tube, and it is assumed that such detector is of the diode type which is commonly employed at the present time. The detector diode is usually provided with a tuned input circuit 3 which is resonated to the operating intermediate frequency, and such an intermediate frequency will be chosen from a range of 75 to 450 k. c. when the receiver is operating in the broadcast range of 550 to 1500 k. c., but the receiver may be employed in any other suitable combination of frequencies.

The diode load resistor is denoted by the numeral 4, and is connected between the low alternating potential side of input circuit 3 and the grounded diode cathode. The numeral 5 designates the tuned circuit feeding the detector input circuit 3, and it is to be understood that circuit 5 can be the intermediate frequency-tuned output circuit of the last intermediate frequency amplifier. The audio voltage developed across load resistor 4 is impressed upon the signal grid of an audio frequency amplifier in any well known manner. Usually there is employed a potentiometer arrangement which comprises a sliding tap 6 which is connected to ground through the audio coupling condenser 7 and the grid leak resistor 8. It is to be understood that the signal grid and cathode of the subsequent audio frequency amplifier (not shown to preserve simplicity of disclosure) will be coupled across the resistor 8. It will be understood that one or more audio amplifiers will be utilized, and that the finally amplified audio voltage will be reproduced in any desired type of loudspeaker.

The sliding tap 6 constitutes the manual volume control instrumentality. When it is adjusted to the anode end of load resistor 4 there is impressed maximum audio voltage on the audio amplifier, while when it is adjusted towards the grounded end of resistor 4 the volume level of the reproduced sound is decreased. It is to be clearly understood that this manual volume control device may be of any construction. The specific type of volume control device is often employed in receivers at the present time, but the manual volume control device may well be a device for varying manually the negative bias applied to a signal grid of a radio frequency amplifier stage. Again, the manual volume control device may be a variable resistor employed between the signal collector and the input electrodes of the first signal transmission tube of the receiver. It is intended that the present invention be applicable to any well known type of manual volume control device employed in radio receivers, and specifically those utilized in receivers constructed for use in automobiles.

In order to control the volume level of reproduced sound as a function of the operating condition of the automobile, there is inserted in series with resistor 8 a second resistor 9. One end of resistor 9 is connected by lead 3 to the armature 11 of an electromagnetic relay whose magnetizable coil is denoted by the numeral 12. The opposite end of resistor 9 is connected by a lead 10 to contact 14. The armature 11 is normally pulled out of contact with element 14 by means of any biasing device 15; merely by way of illustration the device 15 is shown as being a spring which normally draws the armature 11 away from contact 14. The coil 12 is included in series in the storage battery charging line of the automobile. This battery charging line has been schematically represented in the drawing, since those skilled in the art are fully aware of the construction and connections embodied in such a system. For the purposes of the present application it is sufficient to point out that numeral 20 denotes the usual generator which is provided with a mechanical coupling to the engine of the automobile. The dotted line 21 is to be understood as representing such mechanical coupling. In other words, the charging current developed by generator 20 depends upon the speed of the automobile engine. The storage battery of the automobile is denoted schematically by the numeral 22, and it will be noted that its negative terminal is grounded while its positive terminal is connected to one end of the coil 12. The opposite end of coil 12 is connected by lead 23 to the contact 24. The lead 23 includes in circuit the usual ammeter, the latter customarily being located on the operating dashboard of the automobile. The contact 24 is operatively associated with an armature 25 of an electromagnetic relay whose coil is denoted by numeral 26. Armature 25 is connected by lead 27 to one terminal of the generator 20, while the opposite terminal of the generator is grounded. The coil 26 is included in a line 30 which is shunted across the terminals of the generator.

The function of the shunt line 30, as well as of the relay 26—25, is to prevent the generator terminals from being connected in circuit with the storage battery 22 until the voltage output of the generator is above a predetermined voltage magnitude. Usually, this predetermined voltage value is six volts. Hence, when the voltage across the terminals of generator 20 exceeds six volts, then relay coil 26 is energized thereby drawing armature 25 towards it and causing the circuit 20—27—24—25—12—22 to be completed. Of course when the car is idling, or when the speed of the automobile is very low, then the electrical connection between contact 24 and armature 25 is broken, because under those operating conditions the generator 20 has a voltage output which does not exceed the predetermined voltage value.

It will, therefore, be seen that under those conditions the battery charging line is open, and, therefore, the relay coil 12 is unenergized. As a consequence, spring 15 draws armature 11 upwards thereby breaking the electrical connection between contact 14 and armature 11. The resistor 9 is, therefore, effectively in circuit with the manual volume control potentiometer device, and the magnitude of the audio voltage impressed on the audio amplifier is reduced with respect to the magnitude that would be had were the resistor 9 out of circuit with tap 6 and resistor 8. In other words for any setting of the slider 6, inserting resistor 9 in circuit therewith results in a considerable reduction of the volume level of reproduced sound. However, removing resistor 9 from electrical circuit with slider 6 results in a restoration of the volume level to that represented by the position of slider 6.

Assuming now that automobile speed has been increased to a point such that the voltage developed across the terminals of generator 20 is sufficient to cause coil 26 to attract armature 25 thereby closing the battery charging circuit, it will be seen that relay coil 12 will also be energized. This causes the armature 11 to be attracted to coil 12 thereby making electrical connection between contact 14 and armature 11. As a result the resistor 9 is short-circuited, and effectively resistor 9 has been removed from electrical circuit with resistor 8 and slider 6. It will, therefore, be seen that there has been placed in series with the normal volume control device of the receiver an auxiliary resistor, and that there is arranged in series in the battery charging line of the automobile a relay which functions to short-circuit the auxiliary volume control resistor when the automobile engine speed permits the generator 20 to start charging the battery 22.

This results in an increase of volume level when the automobile is in motion, while the volume level is reduced to a tolerable and desired volume level when the automobile is below a critical speed value when it is not in motion. The amount of reduction of the volume level as the car slows down, or stops, may be made controllable by constructing the resistor 9 as a variable resistor denoted by the arrow through resistor 9. Short-circuiting switches 40 and 41 are shown connected across coil 12 and resistor 9 respectively so that these elements may be eliminated from the car radio system if it is desired to dispense with the function provided by the present invention. It is to be understood that the biasing means 15 may be of a type such as to provide a considerable range of adjustment for the force required to be exercised by coil 12 in order to contact armature 11. In other words, biasing means 15 can have a means correlating the speed of the automobile with the short-circuiting of resistor 9.

While I have indicated and described a system for carrying my invention into effect, it will be apparent to one skilled in the art that my invention is by no means limited to the particular organization shown and described, but that many modifications may be made without departing from the scope of my invention, as set forth in the appended claims.

What I claim is:

1. In combination with the storage battery charging line of an automobile and a radio receiver located in the automobile, and said receiver including a volume control device, means operatively associated with the volume control device for providing a desired volume level for the output of the receiver which corresponds to a desired speed of motion of the automobile, and additional means responsive to a voltage magnitude developed in the battery charging line, and corresponding to a speed of the automobile above the aforesaid speed, for rendering said first named means ineffective and thereby increasing automatically the volume level of the receiver output.

2. In combination with the storage battery charging system of an automobile, and which automobile embodies a radio receiver of the type provided with a manual volume control instrumentality for adjusting the volume level of reproduced sound; the improvement which comprises means for controlling the effectiveness of said manual volume control device, and additional means responsive to the voltage magnitude developed in said battery charging system for controlling said first means.

3. In combination with a radio receiver of the type embodied in an automobile, and said receiver including an adjustable volume level control device, an impedance operatively associated with the gain control device for reducing the volume level of the receiver output independently of adjustment of said gain control device, and means responsive to operation of the storage battery charging current in the automobile for rendering ineffective said impedance.

4. An automobile of the type comprising an engine speed-responsive generator in circuit with a storage battery for charging the latter when the motor engine speed exceeds a predetermined speed value, a radio receiver located in the automobile and having an adjustable device for regulating the volume level of the receiver sound output, an auxiliary instrumentality for reducing the volume level independently of adjustment of the first said device, and means responsive to current flow through said battery charging circuit for rendering ineffective said auxiliary means.

5. In combination with an engine speed-responsive generator arranged in circuit with a storage battery adapted to be charged by the generator, a radio receiver having a volume control element, auxiliary volume control means for regulating the receiver output volume level, and additional means responsive to generator charging current for regulating the effectiveness of the auxiliary control means.

6. In a vehicle of the type equipped with an engine speed-responsive generator, a radio receiver having a volume control adjusting device, an auxiliary volume control device operatively associated with the first device for reducing the volume level of the receiver sound output when the vehicle is below a predetermined speed, and means responsive to generator current flow for rendering the auxiliary device inoperative thereby to increase said level when the vehicle speed exceeds the predetermined speed.

7. In combination with a speed-responsive generator arranged in circuit with a storage battery adapted to be charged by the generator, a high frequency signalling system provided with a device for regulating the signal output, and means responsive to generator charging current for regulating the effectiveness of said device.

8. In a vehicle, an engine speed-responsive generator arranged in circuit with a storage battery adapted to be charged by the generator, a high frequency signalling system having a device for adjusting the signal output magnitude, an auxiliary device for regulating the said signal magnitude, and means responsive to generator charging current for regulating the effectiveness of the auxiliary device.

JOHN L. REINARTZ.